(No Model.)  2 Sheets—Sheet 1.

R. D. GRAY.
SERIES PHOTOGRAPHIC CAMERA.

No. 540,545.  Patented June 4, 1895.

WITNESSES:
H. W. Walker
G. M. Hopkins.

INVENTOR
R. D. Gray
BY Munn & Co
ATTORNEYS.

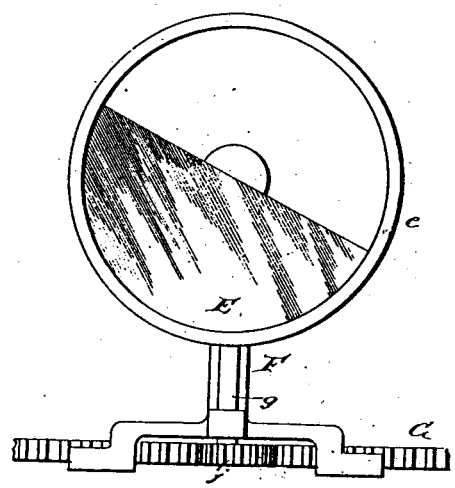
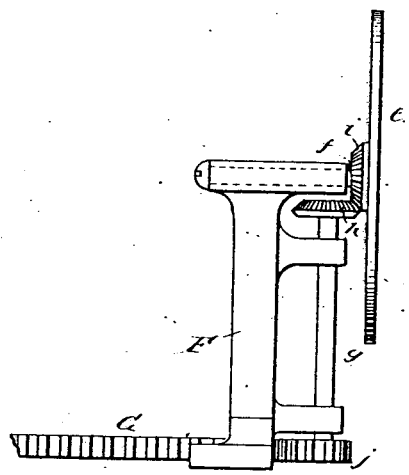
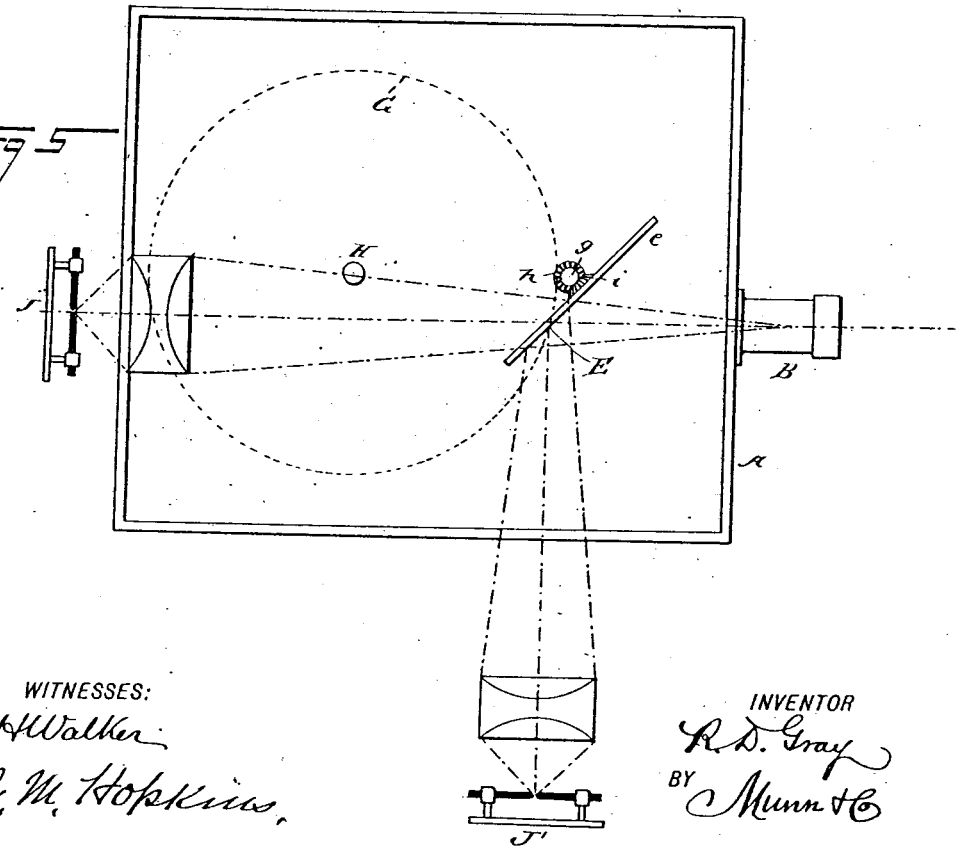

UNITED STATES PATENT OFFICE.

ROBERT D. GRAY, OF NEW YORK, N. Y.

SERIES PHOTOGRAPHIC CAMERA.

SPECIFICATION forming part of Letters Patent No. 540,545, dated June 4, 1895.

Application filed March 9, 1895. Serial No. 541,135. (No model.)

*To all whom it may concern:*

Be it known that I, ROBERT D. GRAY, of New York city, in the county and State of New York, have invented a new and Improved Photographic Camera, of which the following is a full, clear, and exact description.

The object of my invention is to construct a photographic camera for taking a series of photographic pictures of moving objects, and for projecting the pictures thus produced on a screen by the aid of a suitable illuminant and light-controlling devices attached to the camera.

The object is also to provide apparatus for taking a continuous series of pictures so that all the movements of the object are represented in the pictures when projected.

My object is also to produce two series of photographs, the separate pictures of which will be made in alternation, the movement of the sensitive film required for bringing it into position for the exposure of one series alternating with the movement required to bring another portion of the film into position for exposure for a picture of the other series, so that the said movements may each be made with one half the speed that would be required for producing a succession of exposures with intervals of darkness.

My invention consists in a camera provided with an objective, a strip of unexposed sensitive film, guides for holding the film in two focal planes at right angles to each other, a plane segmental revolving mirror arranged on a plane at an angle of forty-five degrees with the axial line of the objective, and constructed to eclipse the direct light beam entering the camera and at the same time reflect it laterally to the portion of the sensitive film lying parallel with the axial line of the lens.

It also consists in devices for moving two portions of the film in alternation along the two focal planes by a step-by-step movement, all as hereinafter more fully described.

Reference is to be had to the accompanying drawings, forming a part of this specification, in which similar letters of reference indicate corresponding parts in all the views.

Figure 1:
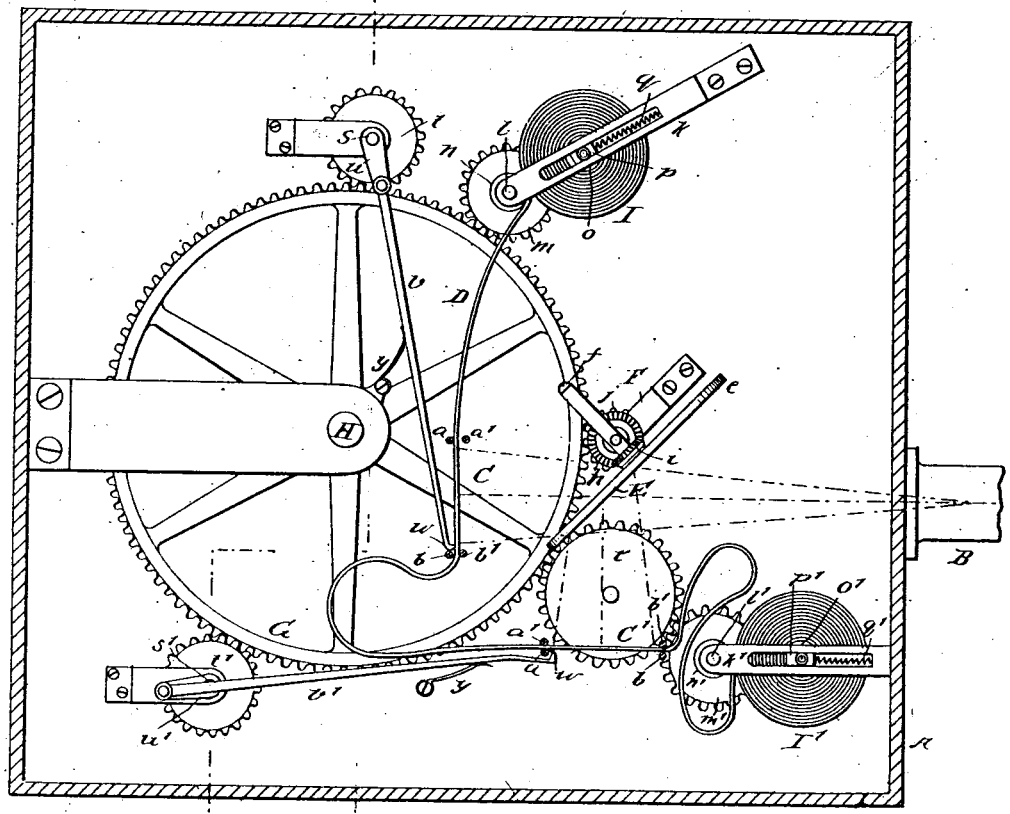
Figure 2:
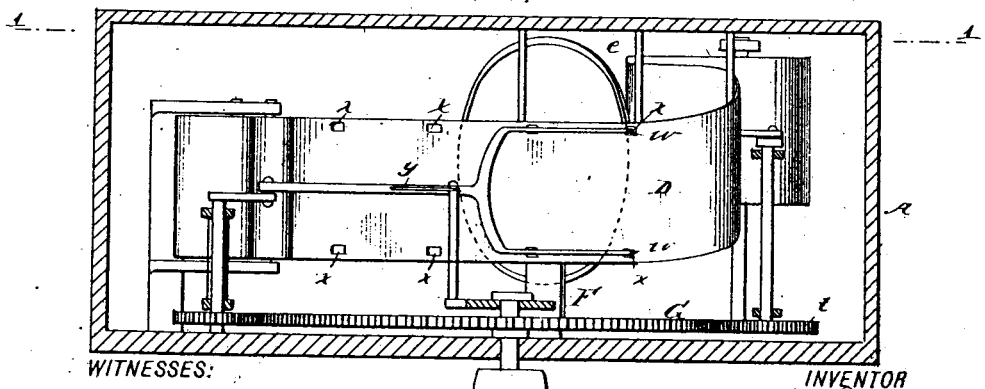

Figure 1 is a horizontal section of my improved camera, taken on line 1 1 in Fig. 2. Fig. 2 is a vertical section of the same, taken on line 2 2 in Fig. 1. Fig. 3 is a front elevation of the segmental revolving mirror. Fig. 4 is a side elevation of the same, and Fig. 5 is a plan view showing the application of the camera to projection.

The box A, which contains the mechanical portions of my improved camera, is provided with a photographic lens B, and is furnished with two film guides C, C', arranged at right angles to each other, each guide being composed of four smaller rollers $a\,a'$, $b\,b'$, between which the sensitive strip D passes, the rollers $a\,b$ being at one side of the portion of the strip to be exposed, and the rollers $a'\,b'$ being at the other side.

The sensitive strip D is designed to receive two series of impressions, one above the other, and since the pictures of the two series are taken at different times with the same lens, the portions of the strip receiving the impression are held in the same horizontal plane, as shown in Fig. 2. On a line bisecting the angle formed by prolonging the two focal planes represented by the portions of the film in the film guides, is arranged a revolving segmental mirror E, whose plane of rotation intersects the prolongation of the axis of the lens B at an angle of forty-five degrees, so that when the mirror revolves, it intercepts the beam of light entering the camera once during each revolution. The direct beam passes to the portion of the film in the guide C, and the reflected beam passes laterally at right angles to the portion of the film in the guide C'. The duration of the time during which the beam is reflected is proportionate to the time during which the direct beam is passing, so that the exposures by the direct beam and reflected beam are equal. The two series of pictures being thus made on the same strip, one series above the other, the upper half of the film being used in the present case for the series of pictures taken by the direct beam, and the lower half being used for the pictures taken by the reflected beam, it is necessary to elevate the film-guide C', as shown in Fig. 2, to bring the lower portion of the film into position for exposure.

It is obviously possible to produce the necessary movements of the film and the rotary motion of the segmental mirror by different means. I shall proceed to describe one way of doing it, but I do not limit myself to this particular way.

The segmental mirror E is mounted on a wheel e carried by the horizontal shaft f journaled in the standard F. The mirror covers one half of the wheel, or as much more as may be required to secure an equal illumination of the film. The portion of the wheel not covered by the mirror is left open and unobstructed to allow the direct light beam from the lens to proceed to the film in the guide C. In the standard F is journaled the vertical shaft g, which carries at its upper end a bevel wheel h which engages a bevel pinion i secured to the shaft f. The lower end of the shaft g carries a spur pinion j. The standard F is secured to the bottom of the camera box A, and the pinion j is engaged by a spur wheel G, mounted on the shaft H journaled in bearings in the camera box. In a bridge k at one side of the wheel G is journaled a shaft l, to which is secured a pinion m, which is engaged by the spur wheel G, and upon the shaft l is secured a roller n, against which is pressed a roll I, of exposed sensitized film. The roller o on which the exposed sensitized film is wound is journaled at one end in a sliding journal box p, placed in a slot in the bridge k and pressed forward by a spiral spring q placed in the slot of the bridge. The other end of the roller o is journaled in a similar spring-pressed sliding box below the roll of film. When the wheel G, and consequently the wheel m and roller n are revolved, the roll I is turned in the direction required for rolling the film. At the opposite side of the camera box is arranged a bridge k' carrying a wheel m', a roller n' a roller o' carrying the roll I' of unexposed film, the roller o' being journaled in a sliding journal box p' pressed forward toward the roller n' by the spring q'. The film D, which is continuous from the roll I' to the roll I, passes through the film guides C C', and as it is unwound from the roll o' and wound upon the roll o, the said roll o' is arranged to revolve in the opposite direction. To secure this movement and at the same time to increase the distance of the roll of unexposed film from the film guides, an intermediate wheel r is placed between the wheel m' and the main wheel G. On opposite sides of the wheel G are journaled shafts s s', carrying spur wheels t t', engaged by the spur wheel G. To the shafts s s' are secured cranks u u', pivotally connected with rods v v', which are forked at their free ends, the ends of the tines of the forks being bent at right angles, and beveled to form hooks w for engagement with the film D, which is provided at its upper and lower edges with perforations x for receiving the hooks w at the ends of the forks. The forked rods v v' are arranged to act on the portions of the film held by the guides C C', and are pressed forward against the film by springs y secured to a fixed portion of the apparatus. The hooks w are thus arranged to reciprocate in planes at right angles to each other. They are also geared so as to work in alternation.

The beam of light entering the camera through the lens B, passes to the portion of the film in the guide C through the open portion of the wheel e, while the portion of the film being exposed is at rest. As soon as the mirror E in its revolution intersects the light beam, the portion of the film in the guide C' is exposed by the reflected beam and the portion just exposed by the direct beam is moved along one space by the hooks w of the rod v, there being sufficient slack in the film D between the guides C and C' to allow of this movement. When the direct beam is again allowed to fall on the portion of the film in the guide C, the portion of the film in the guide C' just exposed by the reflected beam is moved along by the hooks w of the rod v', there being sufficient slack in the film to admit of this movement. In this manner the exposures are made in alternation, and the film is moved along and rolled and unrolled automatically.

When the film has been developed and printed on a similar film for projection, the positive film is placed in the camera and illuminated by two sources of light J, J', which in the present case are electric arc lights, the light being converged by condensers as in an ordinary optical lantern. The film is drawn along by the step-by-step motion, as described in the operation of taking the impressions and the projection is alternately by direct and reflected beams.

The picture which is reversed in taking by reflection is corrected when reversed in projection by reflection.

It is obvious that by means of my improvement I am enabled to make continuous exposures without any periods of darkness, and that I am enabled to project the pictures without any interruption of the light, thus producing better effects on a larger scale than is possible with the methods and apparatus heretofore in use.

Having thus described my invention, I claim as new and desire to secure by Letters Patent—

1. In a photographic camera of the character described, the combination of a lens, two film guides arranged at right angles to each other, means for moving forward the film in the guides, and a segmental mirror arranged to act as a shutter for one field and a means of directing light to the other field, substantially as specified.

2. In a photographic camera of the character described, the combination of a photographic lens, two film guides placed at right angles to each other, a revoluble segmental mirror placed in a plane intersecting the angles formed by the planes of the film guides, and mechanism for moving the film forward with a step-by-step motion, substantially as specified.

3. In a camera for taking negatives of moving objects, the combination of a lens, two film guides, a perforated film passing through the guides, a revolving segmental mirror, and reciprocating hooks for carrying the film through the guides, as specified.

4. The combination, with a camera provided with a lens, revolving segmental mirror, and duplicate film-moving mechanism, of light furnishing and controlling devices for projecting a direct and a reflected beam in alternation.

5. The method of taking a series of photographic pictures to represent motion, which consists in exposing a sensitive film to a continuous beam of light directed on two fields of exposure in alternation, thereby forming a series of images representing all the movements of the moving body.

6. The method of taking a series of photographic pictures, which consists in taking an image on a sensitized surface by a direct continuous beam of light, then covering the exposed surface and replacing the exposed surface while covered with an unexposed sensitized surface and simultaneously deflecting the light beam to another surface, then returning the direct beam to the replaced surface, and at the same time replacing the surface exposed by the deflected beam by an unexposed surface, as herein specified.

ROBERT D. GRAY.

Witnesses:
C. SEDGWICK,
F. W. HANAFORD.